(12) United States Patent
Lindsay et al.

(10) Patent No.: US 9,809,073 B2
(45) Date of Patent: Nov. 7, 2017

(54) TAPERED AXLE/SUSPENSION SYSTEM BEAM FOR HEAVY-DUTY VEHICLES

(71) Applicant: Hendrickson USA, L.L.C., Itasca, IL (US)

(72) Inventors: Sean T. Lindsay, Forest Park, IL (US); Shane A. Tipton, Schaumburg, IL (US); Matthew J. Van Meter, Plainfield, IL (US); Gary E. Gerstenslager, Chicago, IL (US); Michael P. Robinson, Chicago, IL (US)

(73) Assignee: HENDRICKSON USA, L.L.C., Itasca, IL (US)

( * ) Notice: Subject to any disclaimer, the term of this patent is extended or adjusted under 35 U.S.C. 154(b) by 6 days.

(21) Appl. No.: 15/151,686

(22) Filed: May 11, 2016

(65) Prior Publication Data
US 2017/0087949 A1 Mar. 30, 2017

Related U.S. Application Data

(60) Provisional application No. 62/234,227, filed on Sep. 29, 2015.

(51) Int. Cl.
*B60G 9/02* (2006.01)
*B60G 7/00* (2006.01)
(Continued)

(52) U.S. Cl.
CPC ............. *B60G 9/02* (2013.01); *B60G 7/001* (2013.01); *B60G 9/003* (2013.01); *B60G 17/00* (2013.01);
(Continued)

(58) Field of Classification Search
CPC .......... B60G 9/02; B60G 7/001; B60G 17/00; B60G 9/003; B60G 2206/72; B60G 2500/30; B60G 2206/10; B60G 2206/601; B60G 2500/10; B60G 2300/026; B60G 2206/30; B60G 2206/8201; B60G 2204/4302
See application file for complete search history.

(56) References Cited

U.S. PATENT DOCUMENTS

| 4,529,224 A | 7/1985 | Raidel |
| 4,718,692 A | 1/1988 | Raidel |

(Continued)

FOREIGN PATENT DOCUMENTS

| DE | 3119022 A1 | 12/1982 |
| DE | 102006015671 A1 | 10/2007 |

*Primary Examiner* — Darlene P Condra
(74) *Attorney, Agent, or Firm* — Dureska & Moore, LLC; David P. Dureska; David J. Danko

(57) ABSTRACT

An axle/suspension system for a heavy-duty vehicle with a pair of suspension assemblies which each are mounted on a hanger outboardly offset from the outboard surface of the vehicle main member from which it depends. Each suspension assembly includes a beam pivotally attached to the hanger outboardly offset from the outboard surface of the main member. The beam has a tapered profile including an upward outboard taper on at least the inboard side of the beam, which provides clearance between each beam and its respective vehicle main member during upward jounce travel or lifting of the axle/suspension system.

15 Claims, 12 Drawing Sheets

(51) Int. Cl.
*B60G 17/00* (2006.01)
*B60G 9/00* (2006.01)

(52) U.S. Cl.
CPC .. *B60G 2200/31* (2013.01); *B60G 2204/4302* (2013.01); *B60G 2204/4702* (2013.01); *B60G 2206/10* (2013.01); *B60G 2206/30* (2013.01); *B60G 2206/601* (2013.01); *B60G 2206/72* (2013.01); *B60G 2206/8201* (2013.01); *B60G 2300/026* (2013.01); *B60G 2500/10* (2013.01); *B60G 2500/30* (2013.01)

(56) References Cited

U.S. PATENT DOCUMENTS

| | | | |
|---|---|---|---|
| 4,858,949 A | 8/1989 | Wallace et al. | |
| 5,037,126 A | 8/1991 | Gottschalk et al. | |
| 5,039,124 A | 8/1991 | Widmer | |
| 5,203,585 A | 4/1993 | Pierce | |
| 5,366,237 A | 11/1994 | Dilling et al. | |
| 5,375,871 A | 12/1994 | Mitchell et al. | |
| 5,429,423 A * | 7/1995 | Pollock | B60B 35/08 301/124.1 |
| 5,690,353 A | 11/1997 | Vandenberg | |
| 5,845,919 A * | 12/1998 | Vandenberg | B60G 11/10 280/124.17 |
| 5,996,981 A | 12/1999 | Dilling | |
| 6,416,069 B1 * | 7/2002 | Ramsey | B60G 11/28 188/361 |
| 6,508,393 B2 | 1/2003 | Chalin | |
| 6,508,482 B2 | 1/2003 | Pierce et al. | |
| 6,609,649 B1 * | 8/2003 | Barnholt | B21D 53/90 228/171 |
| 6,827,360 B2 | 12/2004 | Chan et al. | |
| 8,292,313 B2 | 10/2012 | Pierce et al. | |
| 8,419,029 B2 | 4/2013 | Muckelrath et al. | |
| 8,454,040 B2 * | 6/2013 | Westnedge | B23P 11/00 280/124.116 |
| 8,490,989 B2 | 7/2013 | Piehl et al. | |
| 9,079,467 B2 | 7/2015 | Westnedge et al. | |
| 2011/0221156 A1 * | 9/2011 | Muckelrath | B60G 9/003 280/124.117 |
| 2012/0056469 A1 * | 3/2012 | Bubulka | B60B 35/003 301/127 |
| 2012/0080862 A1 | 4/2012 | Westnedge et al. | |
| 2012/0126504 A1 * | 5/2012 | Piehl | B60G 9/003 280/124.116 |
| 2012/0291626 A1 | 11/2012 | Westnedge et al. | |
| 2013/0277936 A1 * | 10/2013 | Westnedge | B60G 5/04 280/124.116 |
| 2014/0191486 A1 | 7/2014 | Rarey et al. | |

* cited by examiner

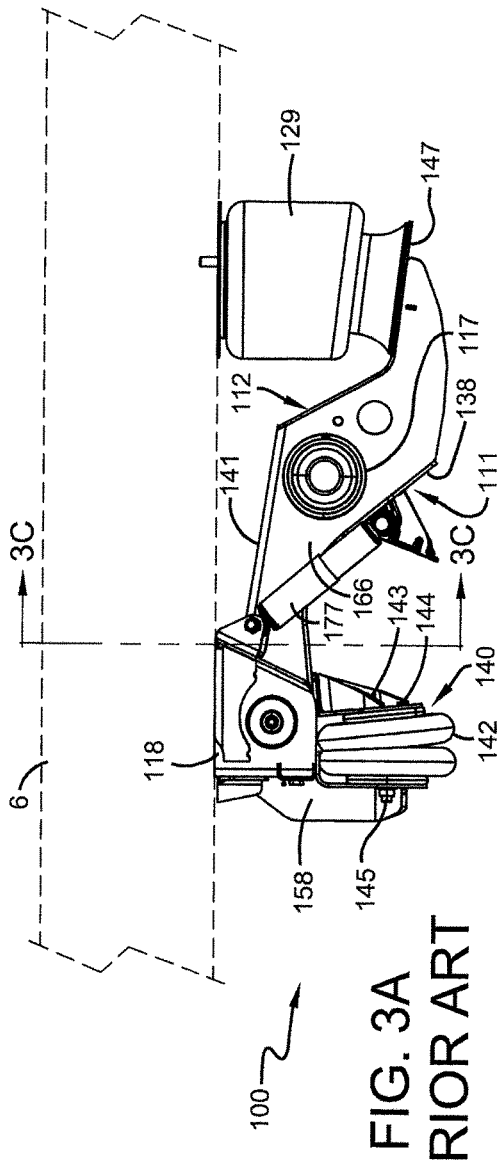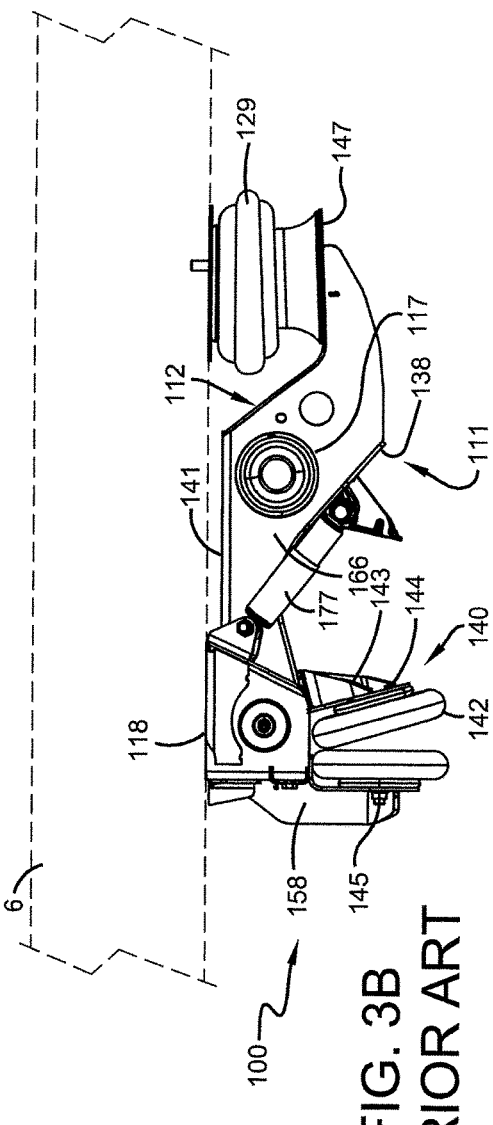
FIG. 3A
PRIOR ART
FIG. 3B
PRIOR ART

TAPERED AXLE/SUSPENSION SYSTEM BEAM FOR HEAVY-DUTY VEHICLES

CROSS-REFERENCE TO RELATED APPLICATION

This application claims the benefit of U.S. Provisional Patent Application Ser. No. 62/234,227, filed Sep. 29, 2015.

BACKGROUND OF THE INVENTION

Technical Field

The invention relates to the art of axle/suspension systems for heavy-duty vehicles. More particularly, the invention relates to beams used in axle/suspension systems of heavy-duty vehicles. Even more particularly, the invention is directed to a beam for an axle/suspension system of a heavy-duty vehicle that features a facetted profile and taper from the bottom to the top of the beam, which enables additional jounce travel of the beam during operation of the heavy-duty vehicle, and in the case of a lift axle/suspension system, additional tire clearance from the ground when in the lifted position. With the additional beam jounce travel and clearance enabled by the tapered beam design of the present invention, an axle pass-through box beam design can be utilized with a heavy-duty tractor, trailer, or truck, thereby decreasing the structural complexity and overall vehicle weight, and increasing the fuel economy of the vehicle.

Background Art

The use of air-ride trailing and leading arm rigid beam-type axle/suspension systems has been very popular in the heavy-duty truck and tractor-trailer industry for many years. Although such axle/suspension systems can be found in widely varying structural forms, generally their structure is similar in that each system typically includes a pair of suspension assemblies. In some heavy-duty vehicles, the suspension assemblies are connected directly to the primary frame of the vehicle. In other heavy-duty vehicles, the primary frame of the vehicle supports a subframe, and the suspension assemblies connect directly to the subframe. For those heavy-duty vehicles that support a subframe, the subframe can be non-movable or moveable, the latter being commonly referred to as a slider box, slider subframe, slider undercarriage, or secondary slider frame. For the purposes of convenience and clarity, reference herein will be made to main members, with the understanding that such reference is by way of example, and that the present invention applies to heavy-duty vehicle axle/suspension systems suspended from main members of: primary frames, moveable subframes and non-moveable subframes.

Typically, each suspension assembly of an axle/suspension system includes a pair of longitudinally extending elongated beams. Each beam is located adjacent to and below a respective one of a pair of spaced-apart longitudinally extending main members and one or more cross members which form the frame of the vehicle. More specifically, each beam is pivotally connected at one of its ends to a hanger which in turn is attached to and depends from a respective one of the main members of the vehicle. An axle extends between and is connected by some means to the beams of the pair of suspension assemblies at a selected location from about the mid-point to the end of the beam opposite from its pivotal connection end. The opposite end of each beam also is connected to a bellows air spring or its equivalent, which in turn is connected to a respective one of the main members. A brake assembly and typically one or more shock absorbers also are mounted on each of the beams and/or axle. A height control valve is mounted on the hanger or main member and is operatively connected to the beam or axle in order to maintain the ride height of the vehicle.

The beam may extend rearwardly or frontwardly from the pivotal connection relative to the front of the vehicle, thus defining what are typically referred to as trailing arm or leading arm axle/suspension systems, respectively. However, for purposes of the description contained herein, it is understood that the term "trailing arm" will encompass beams which extend either rearwardly or frontwardly with respect to the front end of the vehicle. The beam on which the axle is mounted is generally referred to as either a bottom-mount/underslung beam, a top-mount/overslung beam, or a pass-through beam which can be generally classified as either an underslung or overslung beam depending on the location of the other components of the axle/suspension system, as is known in the art. Because of the limited distance between the axle/suspension system beams and the vehicle frame main members at ride height in heavy-duty tractor, trailer, or truck applications, an overslung pass-through beam design is generally not utilized for such applications. Therefore, for purposes of the description contained herein, it is understood that the term "pass-through beam" refers to an underslung pass-through beam design.

The axle/suspension systems of the heavy-duty vehicle act to cushion the ride, dampen vibrations, and stabilize the vehicle. More particularly, as the vehicle is traveling over the road, its wheels encounter road conditions that impart various forces, loads, and/or stresses, to the respective axle on which the wheels are mounted, and in turn, to the suspension assemblies that are connected to and support the axle. One of the many forces a heavy-duty vehicle can encounter during normal vehicle operation is the upward force imparted on the axle/suspension system when one of the attached wheels encounters a road hazard, such as a speed bump or curb. In such instances, the upward force is directed to the vehicle wheel, which in turn causes the axle and beam to which it is attached to travel upwardly. The distance the axle/suspension system travels upwardly as a result of the force is known in the art as suspension jounce. An axle/suspension system works to counter the upward force during jounce movement, and return the system to equilibrium, or normal operating ride height. In an axle/suspension system featuring non pass-through overslung beams, the jounce distance the axle/suspension system can travel is limited to the distance between the top of a beam and the bottom of the main member. In an axle/suspension system featuring non pass-through underslung beams, the jounce distance the axle/suspension system can travel is limited to the distance between the top of the axle and the bottom of the main member. In an axle/suspension system featuring pass-through underslung or overslung beams, the jounce distance the axle/suspension system can travel is limited to the distance between the top of a beam and the bottom of the main member.

It also is common practice for an axle/suspension system of a heavy-duty vehicle to feature a lift assembly to enable lifting of one or more of the axles of a heavy-duty vehicle and to maintain the lifted axles in a raised position, which in turn causes the wheels and tires attached to the raised axles to be lifted off of the ground. Removing certain ones of the heavy-duty vehicle wheels and tires from ground contact typically is done when the trailer is free of payload and less than all of the wheels/tires of the vehicle can adequately support the unloaded trailer, or when greater maneuverability of the vehicle is desired. This lifting operation results in reduced wear on the lifted axle, wheels, and tires when the vehicle is traveling in an unloaded condition. Additionally, lifting can result in toll savings as the axles accounted for in determining toll costs are often only those which are in contact with the ground.

An example of a lift axle/suspension system application is in heavy-duty tractors featuring a 6×2 pusher configuration. Heavy-duty tractors generally feature a non-driven steerable axle situated at the front of the tractor, and two additional axles located at the rear of the tractor. Power from an engine disposed at the front of the tractor is transferred to an attached transmission, which through one of many gear ratios, is further transferred by a longitudinally rearwardly-extending driveshaft to one or more rear axles. In a 6×2 pusher configuration, the drive shaft extends to the rearwardmost axle, which is a driven axle. The axle directly in front of the rear axle, typically referred to as the forward tandem axle, is not driven.

In order for the drive shaft to extend to the rearwardmost tandem axle without interference from the forward tandem axle, the forward tandem axle typically features a drop axle design which allows for clearance of the drive shaft. In such designs, the axle features a downwardly-extending or U-shaped curvature at its longitudinal centerline, which allows the driveshaft to extend to the rear driven axle without interference from the forward tandem axle, while maintaining a ride height similar to that of the driven axle. Moreover, when the forward tandem axle is a lift axle, because the axle features a downwardly-extending or U-shaped curvature at its longitudinal centerline, there is clearance for the drive axle to extend to the rear driven axle without interference from the axle even when it is in the lifted position In heavy-duty tractor applications, prior art lift and non-lift axle/suspension systems typically employ the use of an underslung non pass-through beam design due to the limited clearance beneath the tractor main members that typically prevents use of overslung beam designs. In an underslung beam design, the axle is attached to the top of each beam of the axle/suspension system by a plurality of brackets integrated into the beam and a plurality of U-bolts, which secure the axle to the brackets of each beam. However, axle jounce of the pusher forward tandem axle in an underslung beam configuration is limited by the distance between the frame main member and the axle at ride height. In addition, when the pusher forward tandem axle is a lift axle having an underslung attachment to the beam, clearance between the tires and the ground when the axle is in the lifted position is similarly limited.

In heavy-duty trailer applications, it is common for prior art axle/suspension systems to employ the use of overslung or underslung beam designs since adequate clearance exists beneath the main members of many trailer designs. In a pass-through beam, the axle/suspension system axle is disposed through the rear portion of the beam. Pass-through beams are generally simpler in design, lacking the additional axle seating components such as U-bolts and brackets required to secure an axle to a beam, and thus are generally less complex and lighter compared to non-pass-through overslung and underslung beams. In order to ensure adequate upward travel of the axle/suspension system during vehicle jounce, pass-through beams typically require a higher ride height because the axle jounce travel is limited by the distance between the frame main member and the top of the beam, as compared to the distance between the frame main members and the axle in underslung non pass-through beams. Because of the reduced jounce travel permitted by a much lower ride height in heavy-duty tractors compared to that of heavy-duty trailers, implementing a lift or non-lift axle/suspension system featuring prior art pass-through beams can potentially result in the beams striking the vehicle main members during jounce experienced by the beams as a result of road conditions the vehicle can encounter during operation. This could potentially result in a loss of traction of the rear driven axle, and damage to the beam, vehicle frame, and/or other components of the axle/suspension system. Additionally, because of reduced clearance between the beam and the frame, the vehicle wheels are positioned closer to the ground in a lift axle configuration operating in the lifted position, potentially resulting in damage to the wheels by road debris encountered during operation of the vehicle.

Therefore, a need exists in the art for a heavy-duty axle/suspension system that provides additional beam jounce travel in lift and non-lift axles, and additional ground to wheel clearance in lift axles, so that a pass-through beam can be utilized with a heavy-duty tractor axle/suspension system, resulting in decreased vehicle weight. The axle/suspension system for heavy-duty vehicles of the present invention incorporating the improved beam design satisfies these needs, as will be described below.

BRIEF SUMMARY OF THE INVENTION

An objective of the present invention is to provide an axle/suspension beam for heavy-duty vehicles which provides additional jounce travel between the beam and the main member of the vehicle frame.

Another objective of the present invention is to provide a lift axle/suspension beam for heavy-duty vehicles which provides additional clearance between the tires and the ground when the lift axle/suspension system is in the raised position.

These objectives and others are obtained by the axle/suspension system for a heavy-duty vehicle of the present invention, which includes a pair of suspension assemblies, the axle/suspension system comprising: an axle extending transversely between and being connected to the suspension assemblies, each one of the suspension assemblies including: a hanger attached to, depending from and being offset outboardly from a respective one of a pair of longitudinally extending main members of a frame of the vehicle; and a longitudinally extending beam, the beam including a first end and a second end, the beam first end being pivotally connected to the hanger and the beam second end being connected to the respective main member, the beam capturing said axle, the beam having an upward tapered cross-sectional profile, whereby clearance is provided between the beam and the main member during upward pivotal movement of the beam during suspension assembly jounce or lifting.

BRIEF DESCRIPTION OF THE SEVERAL VIEWS OF THE DRAWINGS

The preferred embodiments of the present invention, illustrative of the best mode in which Applicant has contemplated applying the principles of the invention, are set forth in the following description and are shown in the drawings, and are particularly and distinctly pointed out and set forth in the claims.

FIG. 3A is a fragmentary reduced driver side elevational view, with a main member of the vehicle shown in phantom lines, of the prior art lift axle/suspension system of FIG. 3, showing the position of the beam relative to the vehicle main member at ride height;

FIG. 3B is a view similar to FIG. 3A, showing the position of the beam relative to the vehicle main member at full jounce or in the lifted position;

Similar numerals refer to similar parts throughout the drawings.

DETAILED DESCRIPTION OF THE INVENTION

Figure 2:
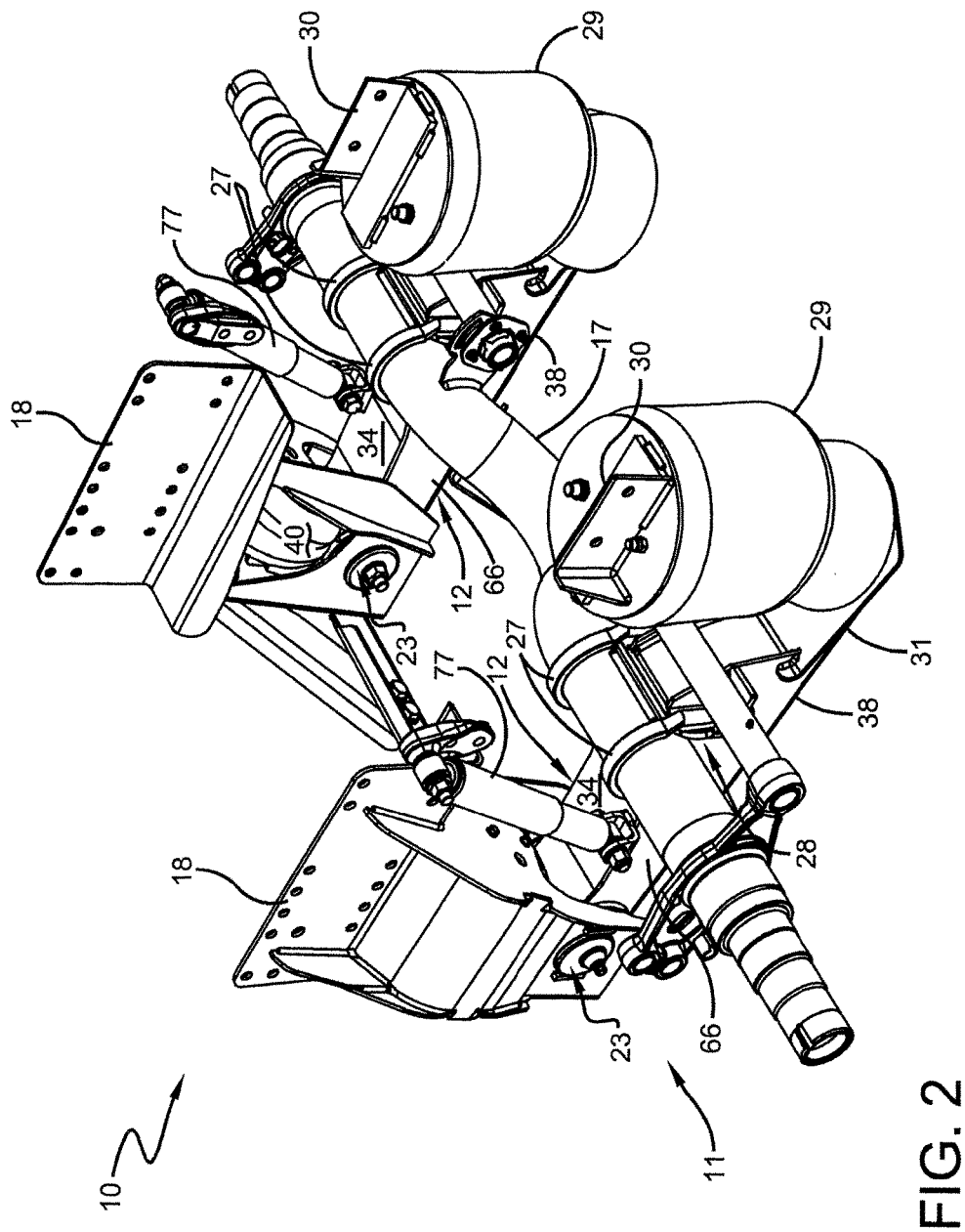
FIG. 2 is a driver side rear perspective view of a prior art lift axle/suspension system of a heavy-duty tractor, showing the axle/suspension system with non pass-through bottom mount/underslung beams.

In order to better understand the improved axle/suspension system for heavy-duty vehicles of the present invention and the environment in which it operates, a prior art air-ride beam-type trailing arm lift axle/suspension system for a heavy-duty tractor is indicated generally at 10, and is shown in FIG. 2.

Figure 1:
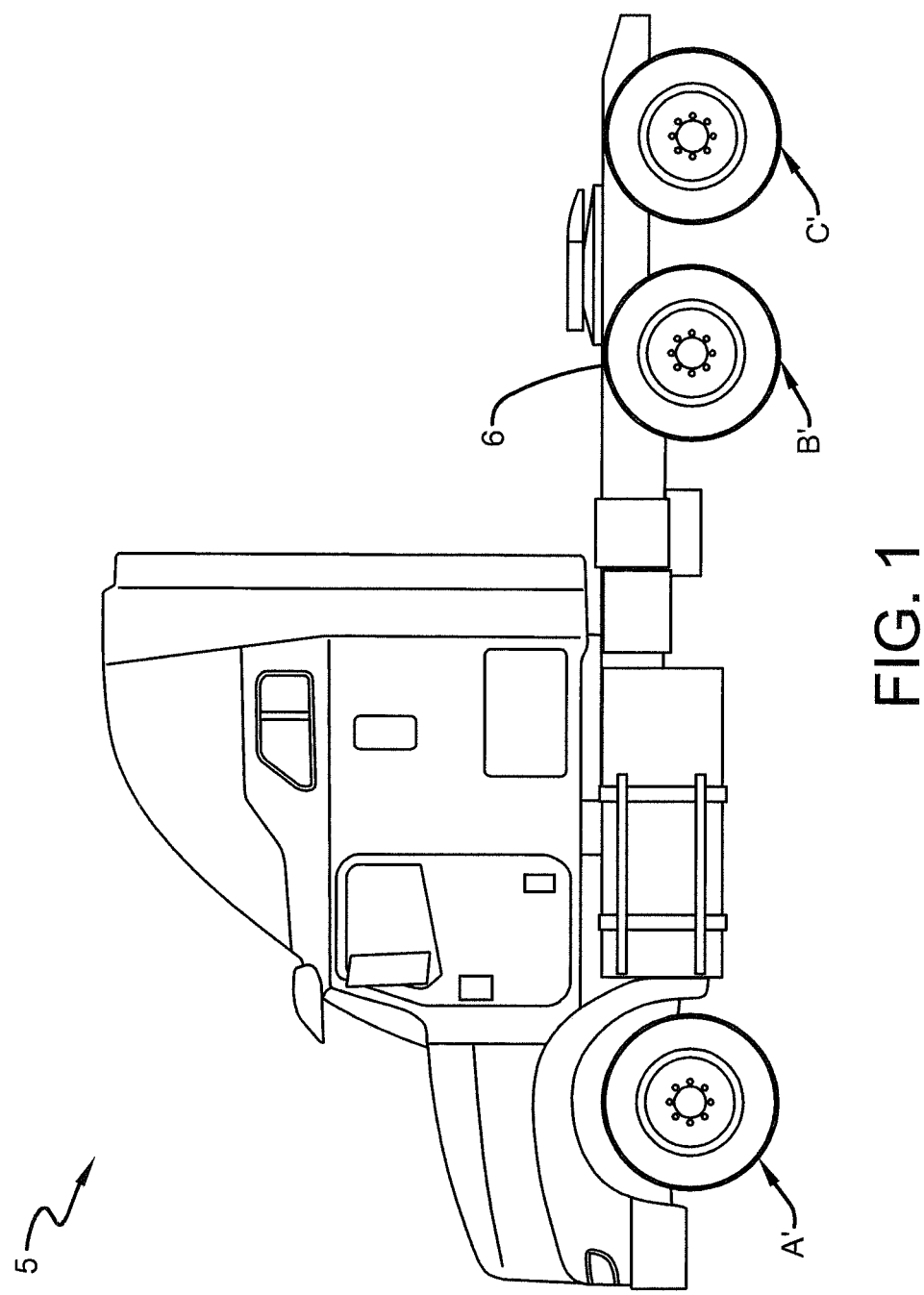
FIG. 1 is a driver side elevational view of a heavy-duty tractor, showing the tractor with a 6×2 axle configuration, including a lowered lift axle/suspension in the forward tandem position.

With reference to FIGS. 1 and 2, axle/suspension system 10 is installed on a heavy-duty tractor 5 which features a 6×2 pusher configuration. Heavy-duty tractor 5 includes two transversely spaced-apart parallel, longitudinally extending frame main members 6, on which vehicle components are mounted. More specifically, a front axle/suspension system position A' located near the front of tractor 5, typically includes a non-driven steerable axle/suspension system (not shown) utilized to steer the vehicle during operation. Main members 6 also have an axle/suspension system position B' and an axle/suspension system position C', which are positioned in tandem and longitudinally spaced from one another generally at the rear end of tractor 5. A driven non-lift axle/suspension system (not shown) typically depends from main members 6 in position C', and is commonly referred to as the rearward tandem axle. A lift axle/suspension system, such as axle/suspension system 10, typically depends from main members 6 in position B', and is commonly referred to as the forward tandem axle. It is understood that a non-lift axle/suspension system alternatively could be disposed in position B'.

With particular reference to FIG. 2, lift axle/suspension system 10 generally includes a pair of suspension assemblies 11, an axle 17, and a pair of hangers 18. Each hanger 18 mounts a respective one of suspension assemblies 11 from its respective main member 6 of heavy-duty tractor 5. Each hanger 18 is securely mounted to position B' of main members 6 (FIG. 1) by any suitable means, such as fasteners, welds, or the like. Inasmuch as axle/suspension system 10 includes generally identical suspension assemblies 11, only one of the suspension assemblies will be described herein, and is shown in FIGS. 2 and 2A.

Figure 2A:
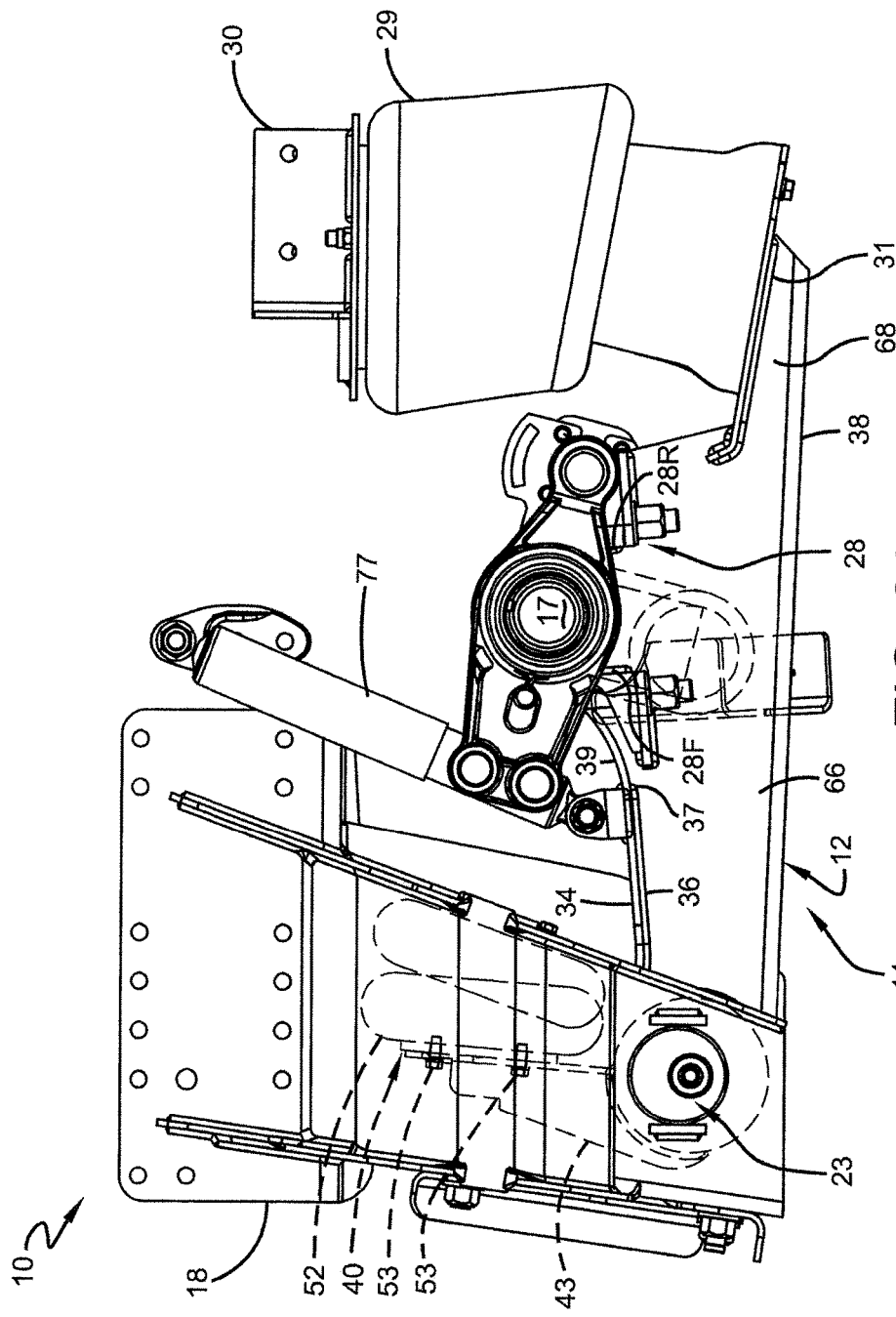
FIG. 2A is an enlarged driver side elevational view, with hidden portions shown in phantom lines, of the prior art lift axle/suspension system shown in FIG. 2.

With reference to FIGS. 2 and 2A, suspension assembly 11 generally includes a beam 12, a bushing assembly 23, an air spring 29, a lift assembly 40, and a shock absorber 77.

Beam 12 includes a pair of transversely spaced-apart sidewalls 66, a bottom plate 38, a first top plate 39, a second top plate 36, an air spring mounting plate 31, and an axle mount bracket assembly 28. Bottom plate 38 typically is welded to sidewalls 66 to form a generally U-shaped member. First top plate 39 and second top plate 36 are secured together by welding along an adjacent interface 37 to form a rigid beam top member 34. Top member 34 in turn is rigidly secured to the open top-portion of the U-shaped member along sidewalls 66, such as by welds, and is vertically spaced from bottom plate 38.

Axle mount bracket assembly 28 is of the type described and shown is U.S. Pat. No. 8,292,313, and assigned to the Applicant of the present invention, Hendrickson U.S.A., L.L.C. Axle mount bracket assembly 28 generally includes a front U-bolt bracket seat 28F and a rear U-bolt bracket seat 28R, together with their respective mounting hardware (not shown). Front U-bolt bracket seat 28F nests in, and is rigidly secured by welding, in a pair of transversely spaced and aligned front slots (not shown) formed in opposing sidewalls 66 of beam 12, frontward of axle 17. Rear U-bolt bracket seat 28R nests in, and is rigidly secured by welding, in a pair of transversely spaced and aligned rear slots (not shown)

formed in opposing sidewalls 66 of beam 12, rearward of axle 17. An arch (not shown) is integrally formed in the upper edge of each of sidewalls 66 between the front and rear slots (not shown). Together, the arch (not shown), first top plate 39, and U-bolt bracket seats 28F,28R form an axle mounting seat (not shown). One of the outboard ends of axle 17 rests on the axle seat (not shown) and extends between beam 12 and the corresponding suspension beam on the opposite side of axle suspension system 10. Axle 17 is attached to beam 12 by a pair of U-bolts 27, which secure the axle to each one of U-bolt bracket seats 28F,28R.

The generally bottom portion of each one of sidewalls 66 extends rearwardly from the axle seat (not shown) and forms two air spring mount loci 68. Air spring mounting plate 31 is generally L-shaped and is rigidly attached to loci 68 by welds (not shown). Air spring 29 is immovably mounted on the rear end of mounting plate 31. A mounting bracket 30 is attached to the top of air spring 29, and is used to in turn attach the air spring to main member 6 of heavy-duty tractor 5 (FIG. 1).

With particular reference to FIG. 2A, a bushing mounting tube (not shown) of bushing assembly 23 is welded or otherwise rigidly attached to the front end of beam 12. The mounting tube (not shown) houses an elastomeric bushing (not shown), which pivotally connects beam 12 to hanger 18, and allows pivotal upward and downward movement of beam 12 relative to the hanger during vehicle operation.

With particular reference to FIG. 2A, lift assembly 40 generally includes an elastomeric bellows-type air chamber 52 and a lift arm 43. Lift arm 43 is welded or otherwise rigidly attached to the mounting tube (not shown) and extends upwardly into hanger 18. As best illustrated in FIG. 2A, the forwardmost end of air chamber 52 is immovably attached to lift arm 43 by fasteners 53. The rearwardmost end of air chamber 52 is immovably attached to hanger 18 by fasteners (not shown). As air from an air supply source (not shown) installed on tractor 5 is introduced into air chamber 52, and air is simultaneously released from air spring 29, the air chamber expands forwardly from the attachment to hanger 18, applying a forward force on lift arm 43, which in turn causes arcuate upward movement of beam 12 about the pivotal connection of bushing assembly 23 to hanger 18. The distance beam 12 can travel upwardly is limited by the attachment of axle 17 to the top surface of the beam, as will be described in greater detail below. Additionally, vehicle ride height can also be controlled by manipulating the pressure within the air-ride system. As such, the vehicle ride height can be increased or decreased by either increasing the fluid pressure in air springs 29 or decreasing the fluid pressure in the air springs, respectively. Shock absorber 77 is attached to beam 12 and extends between the beam and frame member 6 at a selected location to provide damping of the axle/suspension system, as is well known in the art.

Because lift axle/suspension system 10 is situated in the forward tandem position on main members 6 of tractor 5, the axle suspension system must provide clearance for a drive shaft (not shown) to pass rearwardly to the axle/suspension system (not shown) mounted in position C' (FIG. 1), both when the forward tandem axle/suspension system is at ride height and in the lifted position. To accommodate clearance of a drive shaft, axle 17 features a drop or U-shape at about the longitudinal centerline of heavy-duty trailer 5, which provides clearance for a drive shaft (not shown) when axle/suspension system 10 is in a lifted and unlifted position.

As previously discussed, because of the ride height limitation for lift axle/suspension systems utilized in heavy-duty tractor applications, a bottom mount/underslung non pass-through beam design has typically been employed in the prior art. In contrast, because of the increased distance between the axle/suspension system and the vehicle main members on heavy-duty trailers, prior art heavy-duty trailer lift axle/suspension systems have employed a pass-through underslung or overslung beam design due to the weight saving benefits of such beams. Non-pass-through overslung beams could also be used in such an application. In order to better understand the present invention, a prior art underslung pass-through beam typically utilized on axle/suspension systems in heavy-duty trailer applications will now be described.

Figure 3:
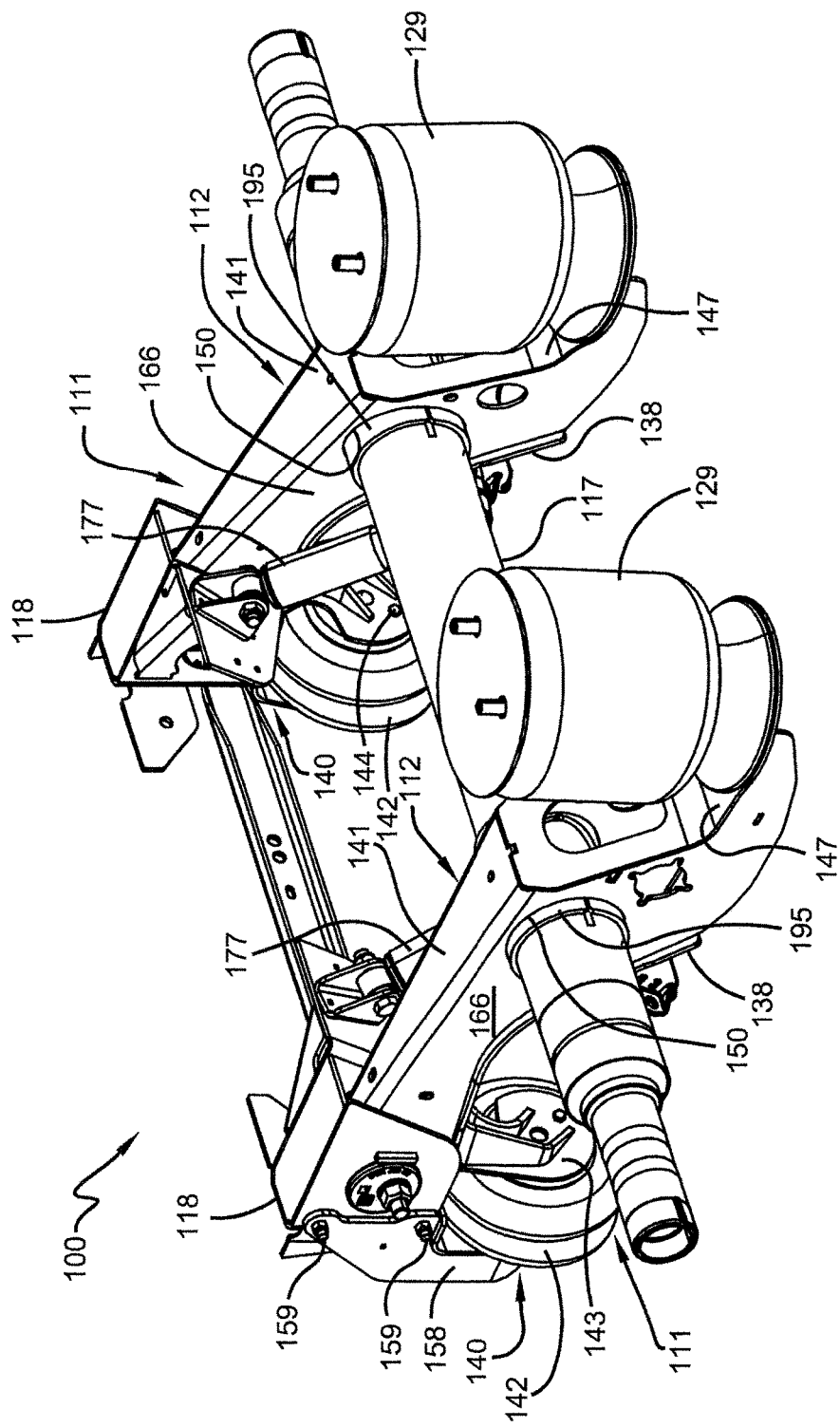
FIG. 3 is a driver side rear perspective view of a prior art lift axle/suspension system of a heavy-duty trailer, showing the axle/suspension system with longitudinally tapered underslung pass-through beams.
Figure 3C:
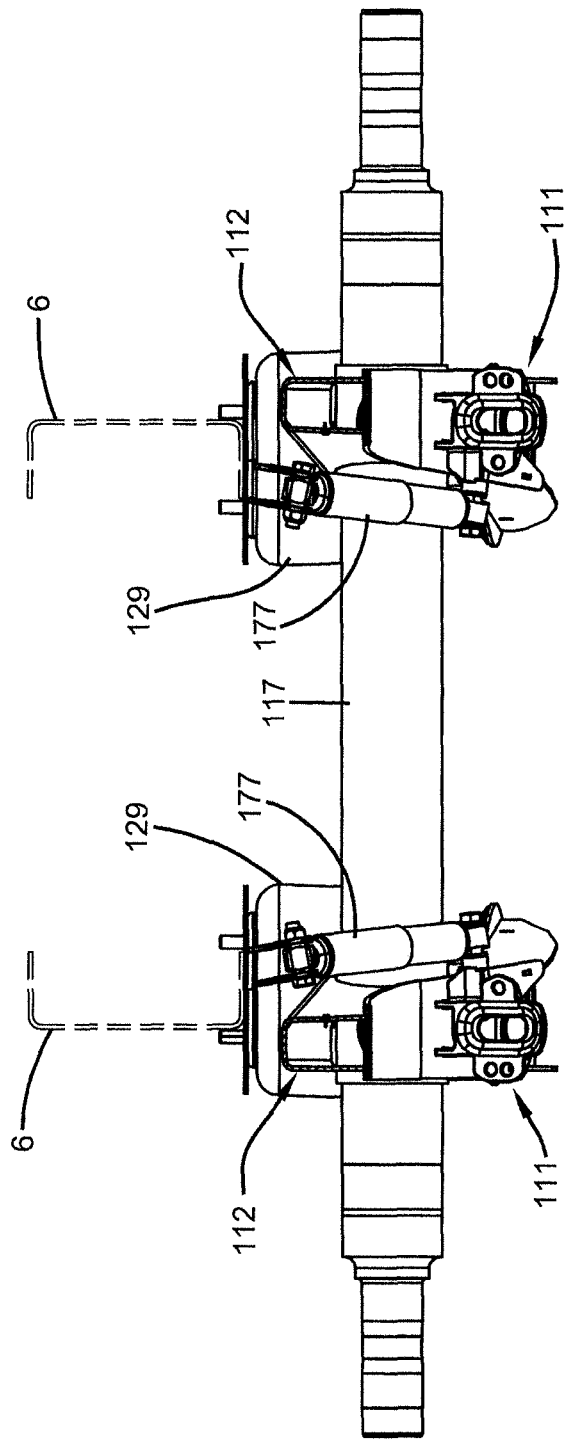
FIG. 3C is a front end cross-sectional view, taken along lines 3C-3C of FIG. 3A, of the prior art lift axle/suspension system, showing the transverse profile of the beam and the beam orientation relative to the vehicle main members.

A lift axle/suspension system featuring two prior art pass-through beams is shown in FIG. 3, and is indicated generally at 100. Lift axle/suspension system 100 generally includes a pair of suspension assemblies 111, an axle 117, a pair of hangers 118, a pair of air springs 129, and a pair of shock absorbers 177.

With continued reference to FIG. 3, lift axle/suspension system 100 is generally similar in operation and structure to lift axle/suspension system 10, except that lift axle/suspension system 100 features a beam 112 which utilizes an underslung pass-through axle-to-beam connection of the type described and shown in U.S. Pat. No. 5,366,237, and assigned to the Boler Company, as well as an axle lift assembly 140 located under the beam. Additionally, because axle/suspension system 100 is of a type used on heavy-duty trailers, and such trailers typically do not utilize drive shafts and therefore do not require a drop axle to accommodate a driveshaft, axle 117 of lift axle suspension system 100 is typically a straight axle. As a result, only the differences between lift axle/suspension 100 and lift axle/suspension system 10 will be described below. Inasmuch as axle/suspension system 100 includes generally identical suspension assemblies 111 each suspended from a respective one of hangers 118, only one of the suspension assemblies will be described herein, and is shown in FIGS. 3, 3A, and 3B.

With particular reference to FIGS. 3, 3A, and 3B, lift axle assembly 140 includes a bracket 143, a support member 158, and an elastomeric bellows-type air chamber 142. The rear end of air chamber 142 is attached to bracket 143 by fasteners 144. Bracket 143 in turn is immovably attached by any suitable means to a bottom plate 138 of beam 112. The front end of air chamber 142 is attached by fasteners 145 to support member 158, which in turn is attached to hanger 118 by fasteners 159. As air from an air-supply source (not shown) installed on tractor 5 is introduced into air chamber 142, and air is simultaneously released from air spring 129, the air chamber expands rearwardly from the attachment to support member 158, applying a rearward force on bracket 143, which causes arcuate upward movement of beam 112 about the pivotal connection of the beam to hanger 118.

Prior art pass-through beam 112 of suspension assembly 111 is formed of a sturdy material, such as steel, and generally includes a top wall 141, bottom plate 138, a pair of sidewalls 166, and an air spring mounting plate 147. Sidewalls 166 are transversely spaced apart, and are integrally formed with top wall 141 as a one-piece, generally inverted U-shaped member. Bottom plate 138 is welded or otherwise rigidly attached to the open end of the U-shaped member along sidewalls 166, and thus is generally vertically spaced from top wall 141. Air spring mounting plate 147 is generally L-shaped, and is welded or otherwise rigidly attached to the rearward most ends of sidewalls 166 and top wall 141. Air spring 129 is mounted on plate 147 and is in turn attached to main member 6 by suitable means, such as fasteners.

Beam 112 tapers generally longitudinally from the connection of air spring 129 to mounting plate 147, to the pivotal connection of the beam to hanger 118. The rearward end of each one of sidewalls 166 is formed with a circular opening 150. Circular opening 150 of each sidewall 166 is transversely aligned with the circular opening of the other sidewall. Axle 117 passes through circular openings 150 of each beam 112 of axle/suspension assembly 100. Axle 117 typically features a pair of sleeves 195 welded on the axle and transversely spaced from one another so that each one of the pair of sleeves is disposed between the axle and its respective one of the pair of beam circular openings 150. Each sleeve 195 in turn is welded to its respective beam 112 at circular openings 150 to provide support to the axle-to-beam connection, as is known in the art. A wheel end assembly (not shown) is installed on each outboard end of axle 117 in a manner known to those skilled in the art.

Pass-through beams, such as beam 112, are generally lighter compared to non pass-through bottom mount/underslung beams, such as beam 12 of axle/suspension system 10, because the beam does not require any additional mounting components, such as U-bolts 27, to attach axle 117 to the beam. As previously discussed, because of the limited axle jounce travel and limited axle lift distance available in heavy-duty tractor and truck applications, a pass-through underslung beam such as beam 112 typically has not been utilized. More specifically, with reference to FIG. 3A, the distance beam 112 of axle/suspension system 100 can travel upward during suspension jounce is limited to the distance between the top of top plate 141 and the bottom of main member 6. Because of the limited clearance between beam 112 and main members 6, the beam can potentially strike the frame main member during normal jounce travel of the axle/suspension system, as is shown in FIG. 3B. Additionally, in lift axle/suspension applications, the distance axle 117 can be lifted is limited by the clearance between top wall 141 of beam 112 and the bottom of main member 6 at ride height. Because of the limited distance axle 117 can be lifted, the vehicle wheels (not shown) attached to the axle are positioned closer to the ground in a lift axle/suspension application operating in the lifted position, potentially resulting in damage to the wheels by road debris encountered during operation of the vehicle.

Therefore, a need exists in the art for a heavy-duty axle/suspension system that provides additional beam jounce travel in lift or non-lift axles, and additional ground to wheel clearance in lift axles, so that an underslung pass-through beam can be utilized with a heavy-duty tractor or truck axle/suspension system, thereby reducing structural complexity and vehicle weight, and in turn improving fuel economy. The axle/suspension system for heavy-duty vehicles of the present invention incorporating the improved beam design satisfies these needs, as will be described below.

A first preferred embodiment air-ride lift axle/suspension system for a heavy-duty vehicle of the present invention, incorporating an improved beam design 212, is indicated generally at 200 and is shown in FIGS. 4, 4A, 4B, and 4C. Axle/suspension system 200 is similar in structure and function to that of axle/suspension system 100 previously described, except that lift axle/suspension system 200 includes a pair of hangers 218, in which each one is attached to and outboardly offset from its respective main member 6, and a pair of first preferred embodiment tapered beams 212.

As a result, only the differences between lift axle/suspension 200 and lift axle/suspension system 100 will be described below.

Figure 4:
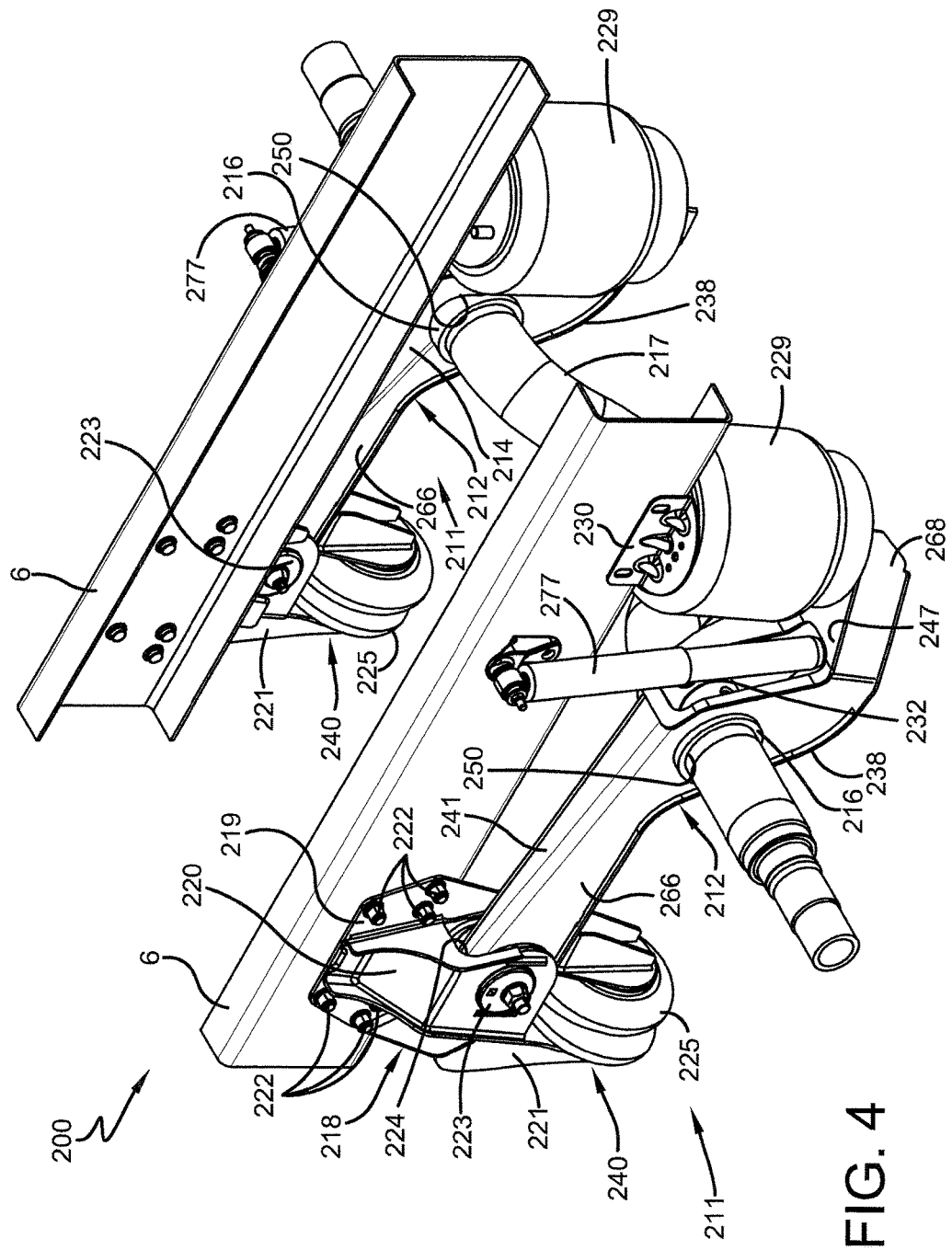
FIG. 4 is a fragmentary driver side rear perspective view of a first preferred embodiment lift axle/suspension system of a heavy-duty vehicle of the present invention incorporating a first improved beam design, showing the lift axle/suspension system mounted on the main members of the vehicle frame.

With reference to FIG. 4, lift axle/suspension system 200 generally includes a pair of underslung/pass-through type suspension assemblies 211, an axle 217, a pair of air springs 229, a pair of shock absorbers 277, and a pair of axle lift assemblies 240. Inasmuch as axle/suspension system 200 includes generally identical suspension assemblies 211 each suspended from a respective one of a pair of hangers 218, only one of the first preferred embodiment suspension assemblies 211 will be described herein.

First preferred embodiment beam 212 of the present invention is formed of a sturdy metal, such as steel, and generally includes a top wall 241, a bottom plate 238, a pair of sidewalls 266, and an air spring mounting plate 247. Sidewalls 266 are integrally formed with top wall 241 as a one-piece, generally inverted U-shaped member. Bottom plate 238 is welded or otherwise rigidly attached to the open end of the U-shaped member along sidewalls 266, and thus is generally vertically spaced from top wall 241. Air spring mounting plate 247 is generally L-shaped, and is welded or otherwise rigidly attached to the rearwardmost ends of sidewalls 266 and top wall 241, and provides a platform for mounting air spring 229.

A bushing assembly 223 is welded or otherwise rigidly attached to the front end of beam 212. Bushing assembly 223 enables pivotal mounting of beam 212 to hanger 218, as will be discussed in detail below.

Beam 212 tapers generally longitudinally from the connection of air spring 229 to mounting plate 247, to the pivotal connection of the beam to hanger 218. Sidewalls 266 are formed with transversely aligned circular openings 250 adjacent the rear end of the sidewalls. An axle wrap 216 of the type described and shown in U.S. Pat. No. 8,454,040, and assigned to Applicant of the present invention, Hendrickson U.S.A., L.L.C., is attached to axle 217. Axle 217 passes through and extends outboardly from each pair of circular openings 250 of each beam 212 of axle/suspension assemblies 211, such that each axle wrap 216 is disposed between the axle and circular openings 250 of its respective beam 212. Wrap 216 typically is attached to axle 217 and beam 212 with welds. The bottom of sidewalls 266 extend downwardly and rearwardly from the connection of axle 217 to beam 212 to form two air spring mount loci 268. Bottom plate 238 is welded or otherwise rigidly attached to the bottom edge of each spring mount loci 268. Air spring mounting plate 247 is generally L-shaped, and is welded or rigidly attached to the top edge of each loci 268 and the rear edge of top wall 241. Mounting plate 247 is formed with an opening 232 which provides access to the interior of beam 212, allowing axle wrap 216 to be welded to circular openings 250 and to axle 217, if necessary depending on the wrap design, from within the beam. Additionally, shock absorber 277, which is attached at one end to main member 6, is disposed through opening 232 and is in turn attached to bottom plate 238 by a fastener 242. Shock absorber 277 provides damping to axle/suspension system 200, as is known in the art. Air spring 229 is immovably mounted on the top rearward end of mounting plate 247. A mounting bracket 230 is attached to the top of air spring 229, and in turn, is attached to main member 6 of heavy-duty tractor 5 (FIG. 1).

Figure 4A:
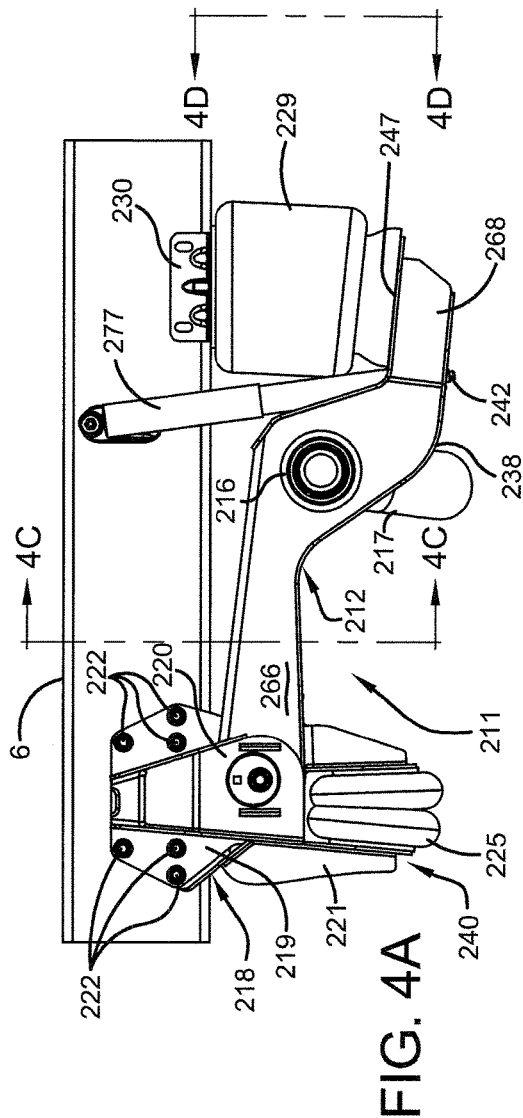
FIG. 4A is a fragmentary reduced driver side elevational view of the lift axle/suspension system of FIG. 4, showing the position of the first embodiment beam relative to the vehicle main member at ride height.
Figure 4B:
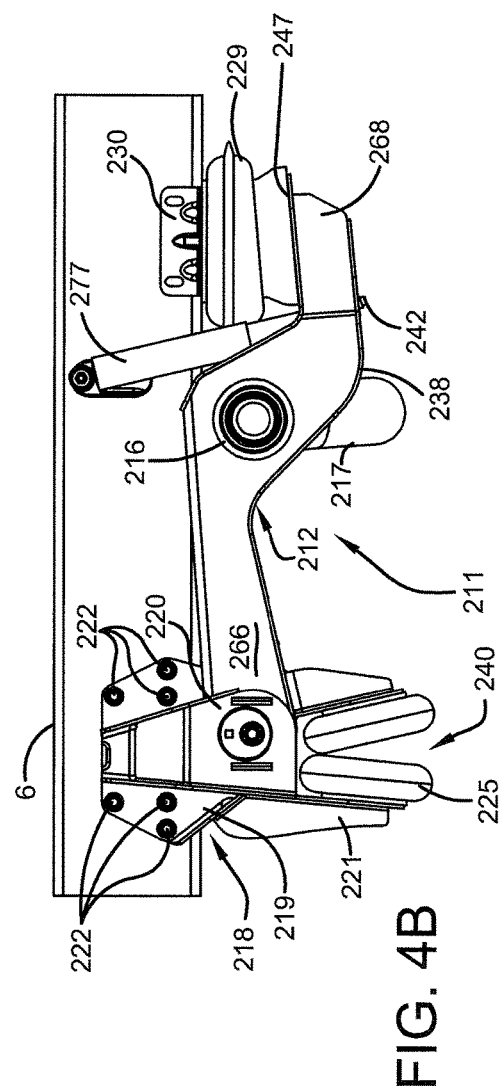
FIG. 4B is a fragmentary reduced elevational view of the lift axle/suspension system of FIG. 4, showing the position of the first embodiment beam relative to the frame member at full jounce or in the lifted position.

In accordance with one of the main features of the present invention, and with particular reference to FIGS. 4A and 4B, hanger 218 of axle/suspension system 200 is attached outboardly offset from main member 6. Hanger 218 includes a vertical mounting plate 219. Mounting plate 219 is attached to the outboard surface of main member 6 by fasteners 222 and extends downwardly from the attachment to the main member. A beam housing wall 220 is welded or otherwise rigidly attached to the outboard surface of plate 219. Beam housing wall 220 extends outboardly and downwardly from the attachment to plate 219. Beam housing wall 220 and plate 219 are each formed with a respective transversely aligned opening (not shown). A lift support member 221 is welded or otherwise rigidly attached to beam housing wall 220 and mounting plate 219 and extends downwardly from the beam housing wall and mounting plate to provide a surface for attachment of an elastomeric-type air chamber 225 of axle lift assembly 240. Support member 221, mounting plate 219, and beam housing 220 combine to form a generally inverted channel 224 that is outboardly offset from main member 6. Beam 212 is disposed in channel 224, so that bushing assembly 223 is transversely aligned with the transversely aligned openings (not shown) of beam housing wall 220 and plate 219. Bushing assembly 223 is pivotally mounted on plate 219 and beam housing wall 220 in a manner well known in the art.

The distance that frame hanger 218 is outboardly offset from main member 6 is limited by the required axle length for attachment of a wheel hub (not shown) and installation of a wheel (not shown) on the outboard extension of axle 217 from circular openings 250. Although at the front end of prior art tapered beams, such as beam 112, there is sufficient clearance between the beam and main member 6 at the maximum allowable offset of the hanger, during a jounce event or when the axle is in the lifted position, there is insufficient clearance at the rear end of the beam because of the increased beam width at the pass-through connection of axle 117 to the beam.

Figure 4C:
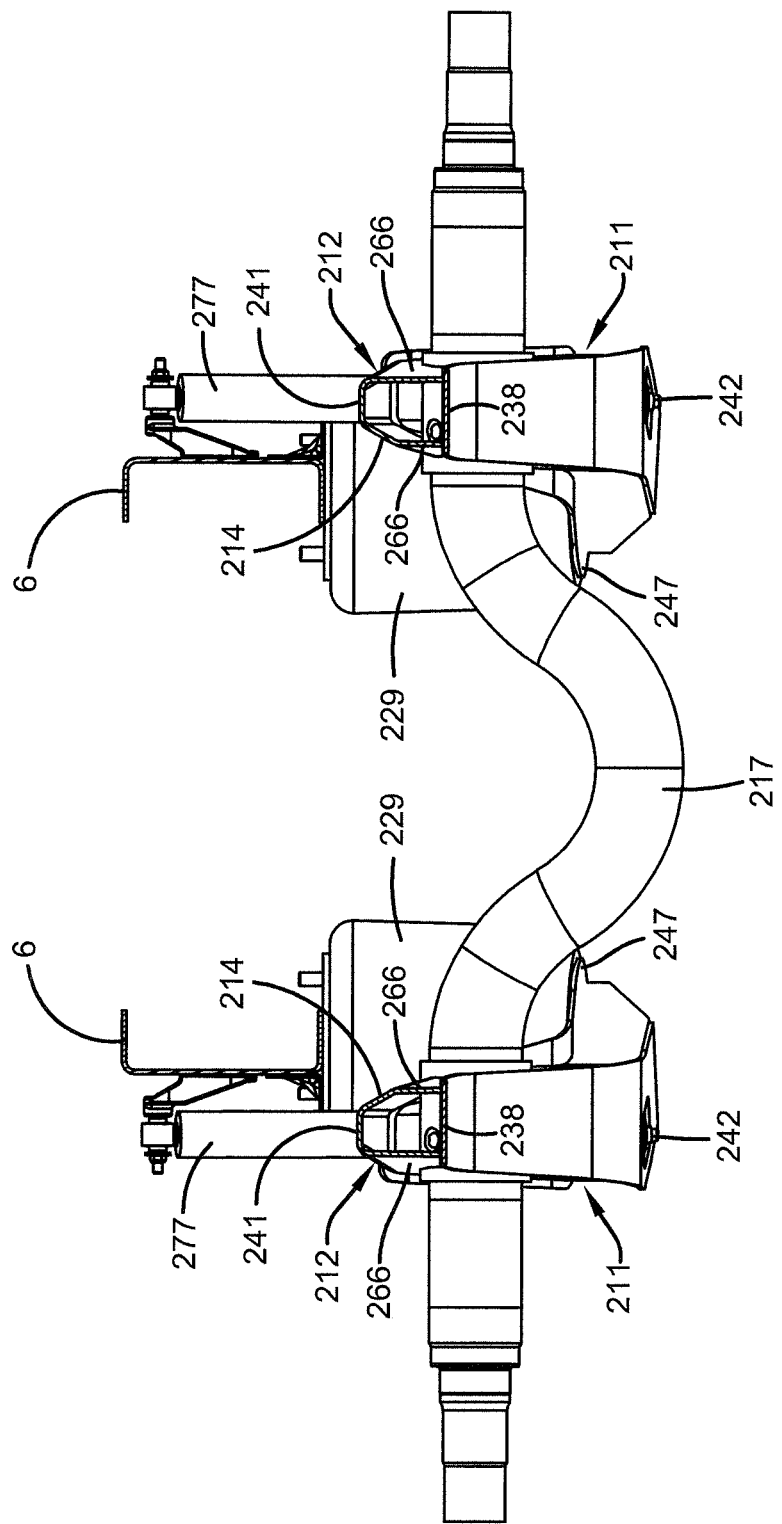
FIG. 4C is a transverse cross-sectional view, taken along lines 4C-4C of FIG. 4A, and showing the transverse tapered profile of the first embodiment improved beam, and the offset beam orientation relative to the vehicle main members.

In accordance with another important feature of the first preferred embodiment axle/suspension system of the present invention, and as best shown in FIG. 4C, beam 212 includes a facetted cross-sectional profile which features an upward outboard taper 214 formed on inboard sidewall 266. Taper 214 extends longitudinally from the inboard loci 268 of sidewall 266 to bushing mounting assembly 223. Because the inboard side of beam 212 tapers upwardly outboardly, and the beam is pivotally attached to hanger 218 outboardly from main member 6, jounce travel is not limited to the distance between the top of the beam and the vehicle main member, but instead the distance between the axle and the main member. Therefore, beam 212 provides additional jounce travel clearance compared to prior art pass-through beams, such as beam 112. For example, at an 8.3 inch ride height, as shown in FIG. 4A, first preferred embodiment beam 212 of the present invention is capable of traveling upwardly about 5 inches during jounce movement without axle 217 striking main member 6 of the heavy-duty tractor 5. In contrast, at the same 8.3 inch ride height, prior art pass-through beam 112 would only allow the beam to travel upwardly about 3.8 inches without the axle striking the main member of the heavy-duty tractor, resulting in an increase in jounce travel by an additional 1.2 inches. FIGS. 4A and 4B show the differences in position of the first preferred embodiment axle/suspension system beam of the present invention at ride height, and at maximum jounce travel or axle/suspension system lift position, respectively.

Figure 4D:
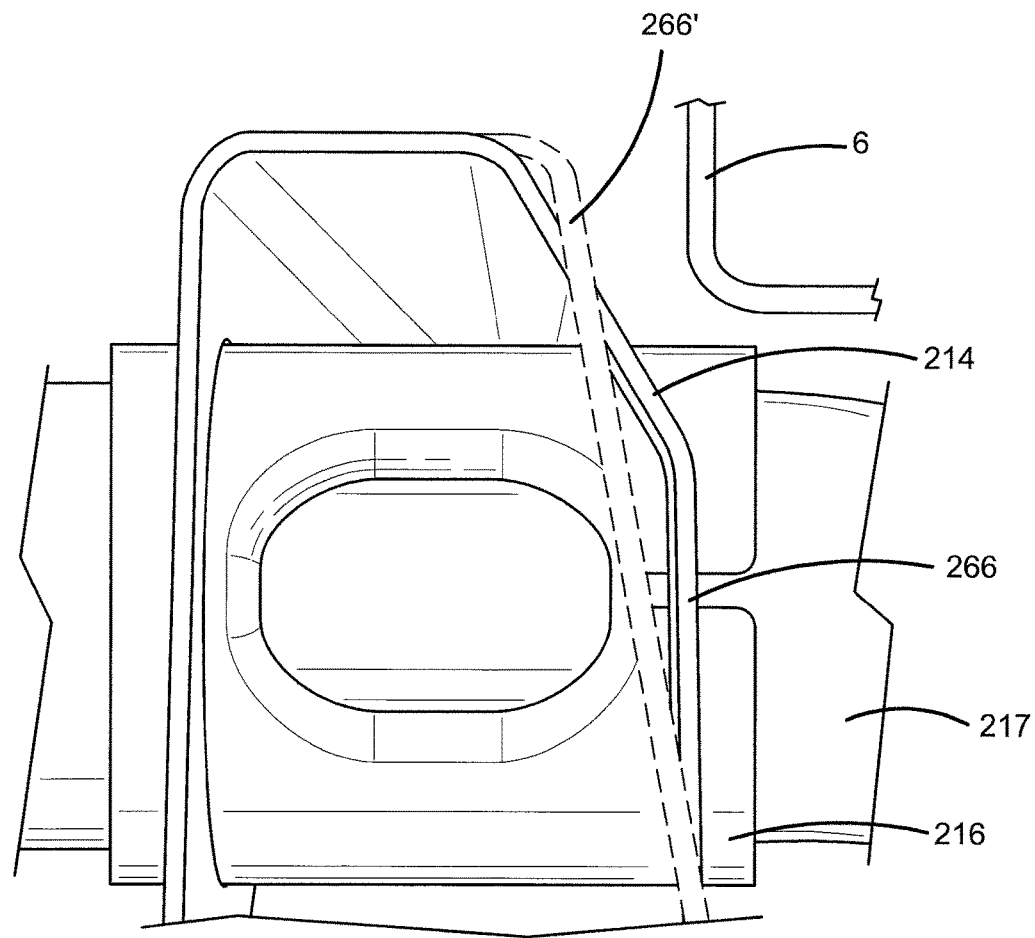
FIG. 4D is a fragmentary elevational view, in the direction of lines 4D-4D of FIG. 4A, of the driver side beam with the air spring, air spring mounting plate, shock absorber, and components of the suspension assembly forward of the axle removed, showing the transverse tapered profile of the first embodiment improved beam, and further showing an alternative linear tapered profile in phantom lines.

Turning now to FIG. 4D, first preferred embodiment beam 212 can alternatively include a linear upward outboard tapered sidewall 266'. Sidewall 266' extends longitudinally from inboard loci 268 toward bushing mounting assembly 223, and transitions at a selected location adjacent to the bushing mounting assembly from a cross-sectional profile having the linear upward outboard taper to a suitable cross-sectional profile which facilitates attachment of the front end of beam 212 to the bushing mounting assembly, as will be appreciated by those having ordinary skill in the art. Because sidewall 266' is linear and does not include a bend as in sidewall 266, sidewall 266' provides increased manufacturability.

Because of the additional jounce travel enabled by taper 214 of beam 212 of the first embodiment axle/suspension system of the present invention, a simpler and lighter pass-through beam design can be implemented in lift axle/suspension systems for heavy-duty tractors, thereby decreasing the vehicle complexity and weight, as compared to non pass-through beam designs utilizing additional structural components such as U-bolts, brackets, and the like, and in turn increasing fuel economy. Moreover, the additional clearance between beam 212 and main member 6 allows wheels (not shown) attached to the axle/suspension system to be lifted to a higher position compared to lift axle/suspension systems utilizing prior art pass-through beams, thereby decreasing the potential of damage to the tire by road debris during operation of the vehicle when the axle/suspension system is in a lifted position.

Figure 5:
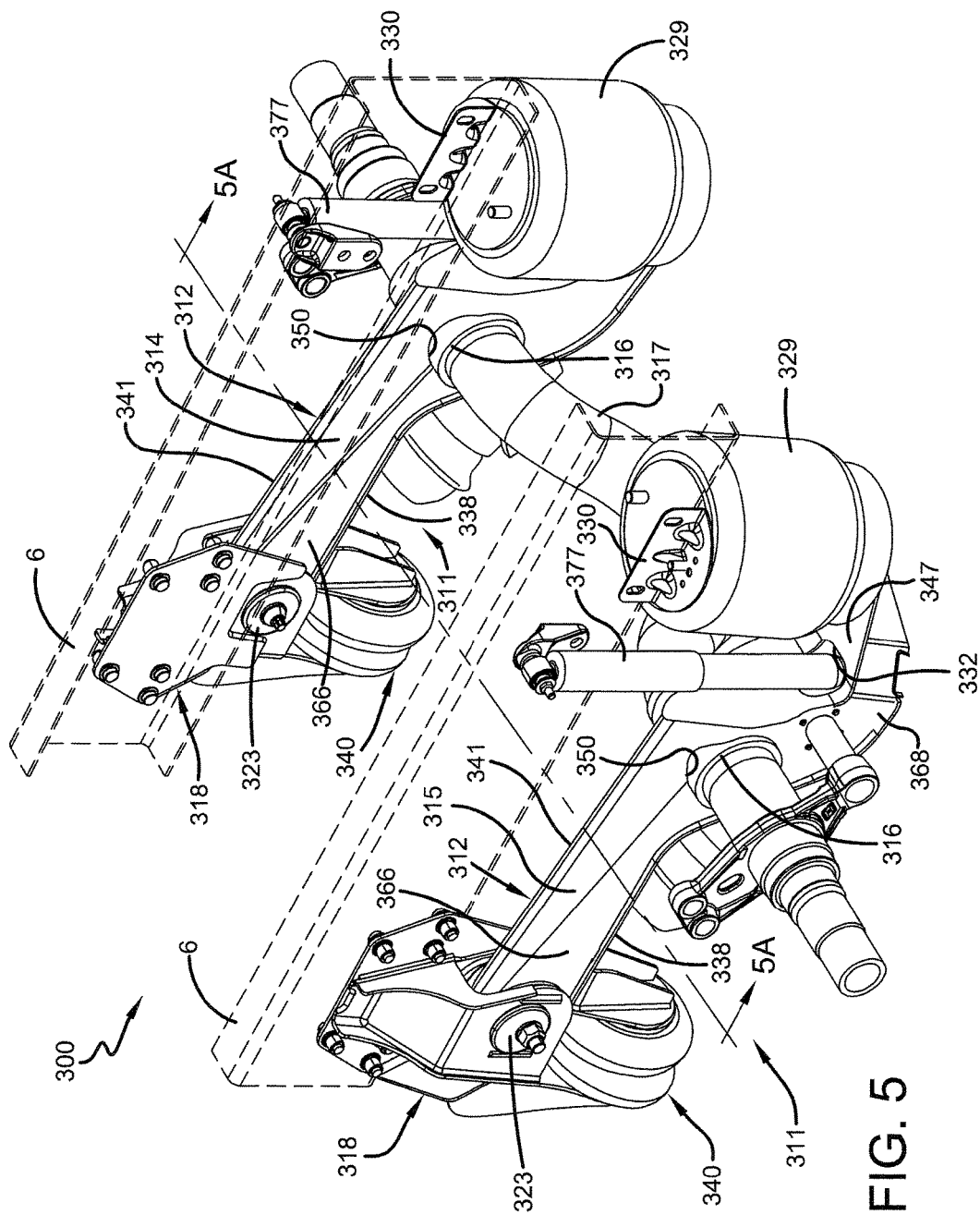
FIG. 5 is a fragmentary driver side rear perspective view of a second preferred embodiment lift axle/suspension system of a heavy-duty vehicle of the present invention incorporating a second improved beam design, showing the heavy-duty vehicle main members in phantom lines.
Figure 5A:
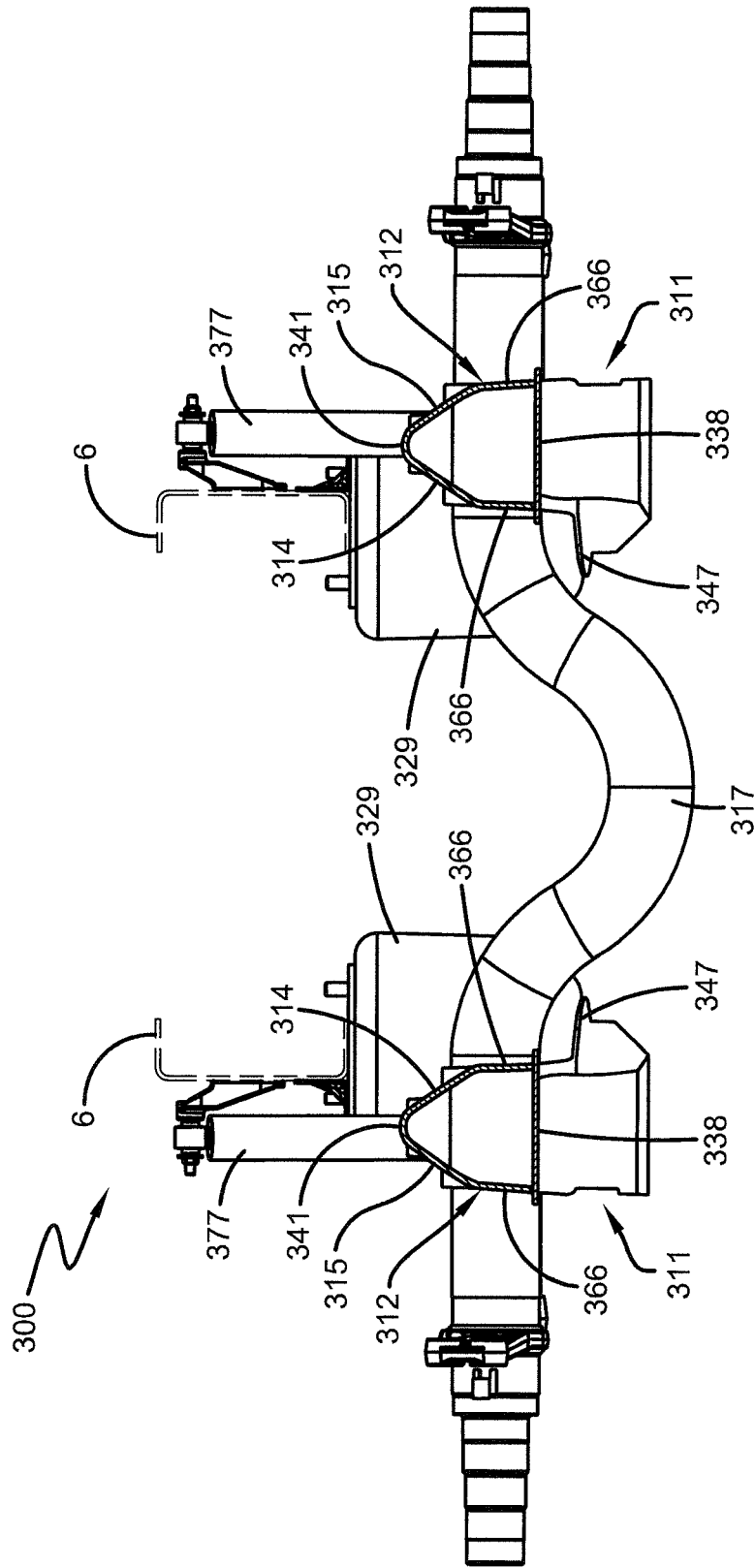
FIG. 5A is a rear transverse cross-sectional view taken along lines 5A-5A of FIG. 5, and showing the transverse tapered profile of the second embodiment improved beam, and the offset beam orientation relative to the heavy-duty vehicle main members.

A second preferred embodiment air-ride lift axle/suspension system for a heavy-duty vehicle of the present invention incorporating a second improved beam design 312, is indicated generally at 300 and is shown in FIGS. 5 and 5A. Axle/suspension system 300 is similar in structure and function to that of axle/suspension system 200 previously described, except that lift axle/suspension system 300 includes a pair of beams 312 employing a second improved design. As a result, only the differences between second preferred embodiment tapered beam 312 and first preferred embodiment tapered beam 212 will be described in detail below.

With reference to FIG. 5, lift axle/suspension system 300 generally includes a pair of underslung/pass-through type suspension assemblies 311, an axle 317, a pair of air springs 329, a pair of shock absorbers 377, a pair of hangers 318, and a pair of axle lift assemblies 340. Inasmuch as axle/suspension system 300 includes generally identical suspension assemblies 311 each suspended from a respective one of pair of hangers 318, only one of the second preferred embodiment suspension assemblies 311 will be described herein.

Second preferred embodiment beam 312 of the present invention is formed of a sturdy metal, such as steel, and generally includes a top wall 341, a bottom plate 338, a pair of sidewalls 366, and an air spring mounting plate 347. Sidewalls 366 are integrally formed with top wall 341 as a one-piece, generally inverted U-shaped member. Bottom plate 338 is welded or otherwise rigidly attached to the open end of the U-shaped member along sidewalls 366, and thus is generally vertically spaced from top wall 341. Air spring mounting plate 347 is generally L-shaped, and is welded or otherwise rigidly attached to the rearwardmost ends of sidewalls 366 and top wall 341, and provides a platform for mounting air spring 329.

A bushing assembly 323 is welded or otherwise rigidly attached to the front end of beam 312. Bushing assembly 323 enables pivotal mounting of beam 312 to hanger 318.

Beam 312 tapers generally longitudinally from the connection of air spring 329 to mounting plate 347, to the pivotal connection of the beam to hanger 318. Sidewalls 366 are formed with transversely aligned circular openings 350 adjacent the rear end of the sidewalls. An axle wrap 316 of the type described and shown in U.S. Pat. No. 8,454,040, and assigned to the Applicant of the present invention, Hendrickson U.S.A., L.L.C., is attached to axle 317. Axle 317 passes through and extends outboardly from each pair of circular openings 350 of each beam 312 of suspension assemblies 311, such that each axle wrap 316 is disposed between the axle and circular openings 350 of its respective beam 312. Wrap 316 typically is attached to axle 317 and beam 312 with welds. The bottom portion of sidewalls 366 extend downwardly and rearwardly from the connection of axle 317 to beam 312 to form two air spring mount loci 368. Bottom plate 338 is welded or otherwise rigidly attached to the bottom edge of each spring mount loci 368. Air spring mounting plate 347 is generally L-shaped, and is welded or rigidly attached to the top edge of each loci 368. Mounting plate 347 is formed with an opening 332. Shock absorber 377, which is attached at one end to main member 6, is disposed through opening 332 and is in turn attached to bottom plate 338 by a fastener (not shown). Shock absorber 377 provides damping to axle/suspension system 300, as is known in the art. Air spring 329 is immovably mounted on the top rearward end of mounting plate 347. A mounting bracket 330 is attached to the top of air spring 329, and in turn is attached to main member 6 of a heavy-duty vehicle, such as heavy-duty tractor 5 (FIG. 1).

In accordance with an important feature of the second preferred embodiment tapered beam of the present invention, and as best shown in FIG. 5A, beam 312 includes a facetted cross-sectional profile which features an upward outboard taper 314 and an upward inboard taper 315 formed in top wall 341. Both taper 314 and taper 315 extend longitudinally from the inboard and outboard loci 368 of sidewall 366, to bushing mounting assembly 323. Because the inboard side of beam 312 tapers upwardly outboardly at taper 314, and the beam is pivotally attached to hanger 318 outboardly from main member 6, jounce travel is not limited to the distance between the top of the beam and the vehicle main member, but instead the distance between axle 317 and the main member. Therefore, beam 312 provides the same benefits as described with reference to first preferred embodiment beam 312, and in addition, reduces the material required to form the beam, resulting in additional weight and fuel savings.

It is understood that beams 212,312 of the present invention can be utilized on heavy-duty tractors, as well as other vehicles such as heavy-duty trucks or even trailers without affecting the overall concept of the invention. It is also understood that beams 212,312 of the present invention could be utilized in both trailing arm and leading arm axle/suspension system configurations for heavy-duty vehicles, without affecting the overall concept of the invention. It is further understood that beams 212,312 of the present invention can be utilized in both liftable and non-liftable heavy-duty vehicle axle/suspension systems, without affecting the overall concept of the present invention. It is also understood that beams 212,312 could find application in axle/suspension systems having different structures and arrangements of their various components than those shown and described herein, including those utilizing different hangers, air springs, shock absorbers, lift assemblies, axle-to-beam connections, non-air-ride axle/suspension systems and the like. It is further understood that beams 212,312 could be formed of composites, and the like. It is also understood that the upward taper of beams 212,312 could have other transverse cross-sectional tapered profiles than those shown and described, such as, for example, a rounded profile or multiple faceting of top wall 241,341 or sidewalls 266,366, and the like.

Accordingly, the improved axle/suspension system for heavy-duty vehicles of the present invention is simplified, provides an effective, safe, inexpensive, and efficient structure which achieves all the enumerated objectives, provides for eliminating difficulties encountered with prior art axle/suspension systems, and solves problems and obtains new results in the art.

In the foregoing description, certain terms have been used for brevity, clarity and understanding; but no unnecessary limitations are to be implied therefrom beyond the requirements of the prior art, because such terms are used for descriptive purposes and are intended to be broadly construed. Moreover, the present invention has been described with reference to specific embodiments. It shall be understood that this illustration is by way of example and not by way of limitation, as the scope of the invention is not limited to the exact details shown or described. Potential modifications and alterations will occur to others upon a reading and understanding of this disclosure, and it is understood that the invention includes all such modifications and alterations and equivalents thereof.

Having now described the features, discoveries and principles of the invention, the manner in which the improved axle/suspension system for heavy-duty vehicles of the present invention is constructed, arranged and used, the characteristics of the construction and arrangement, and the advantageous, new and useful results obtained; the new and useful structures, devices, elements, arrangements, parts and combinations are set forth in the appended claims.

What is claimed is:

1. An axle/suspension system for a heavy-duty vehicle including a pair of suspension assemblies, said axle/suspension system comprising:
    a) an axle extending transversely between and being connected to said suspension assemblies, each one of the suspension assemblies including:
        i) a hanger attached to, depending from and being offset outboardly from a respective one of a pair of longitudinally extending main members of a frame of said vehicle; and
        ii) a longitudinally extending beam, said beam including a first end and a second end, said beam first end being pivotally connected to said hanger and said beam second end being connected to said respective main member, the beam capturing said axle, said beam having an upward tapered transverse cross-sectional profile, whereby clearance is provided between the beam and the main member during upward pivotal movement of said beam during suspension assembly jounce or lifting.

2. The axle/suspension system for a heavy-duty vehicle of claim 1, wherein a sidewall of said beam includes an upward outboard taper.

3. The axle/suspension system for a heavy-duty vehicle of claim 2, wherein an inboard sidewall of said beam includes an upward outboard taper.

4. The axle/suspension system for a heavy-duty vehicle of claim 2, wherein said sidewall includes a bend.

5. The axle/suspension system for a heavy-duty vehicle of claim 2, wherein said sidewall is linear.

6. The axle/suspension system for a heavy-duty vehicle of claim 1, wherein a top wall of said beam includes an upward taper.

7. The axle/suspension system for a heavy-duty vehicle of claim 1, further comprising an air spring mounted on said beam second end.

8. The axle/suspension system for a heavy-duty vehicle of claim 1, wherein said beam is formed of a sturdy metal.

9. The axle/suspension system for a heavy-duty vehicle of claim 8, wherein said sturdy metal is steel.

10. The axle/suspension system for a heavy-duty vehicle of claim 1, further comprising a lift assembly, said lift assembly enabling said beam to be controllably lifted or lowered about the pivotal connection of said beam first end to said hanger.

11. The axle/suspension system for a heavy-duty vehicle of claim 10, wherein said lift assembly enables said beam to be maintained in a lifted position.

12. The axle/suspension system for a heavy-duty vehicle of claim 1, further comprising a wrap attached to said axle, said wrap being disposed between the axle and said beam, the wrap being immovably attached to the beam.

13. The axle/suspension system for a heavy-duty vehicle of claim 12, wherein said wrap is attached to said axle by welding.

14. The axle/suspension system for a heavy-duty vehicle of claim 1, wherein a transverse width of said beam increases along a longitudinal length of the beam from said beam first end to said beam second end.

15. The axle/suspension system for a heavy-duty vehicle of claim 1, wherein said axle includes a downwardly-extending curvature at a longitudinal centerline of the axle.

\* \* \* \* \*